3,427,360
PROCESS FOR THE MANUFACTURE OF 5-ALKENYL-2-NORBORNENES
Henry S. Makowski, Scotch Plains, N.J., assignor to Esso Research and Engineering Company, a corporation of Delaware
No Drawing. Filed Mar. 4, 1968, Ser. No. 709,887
U.S. Cl. 260—666      10 Claims
Int. Cl. C07b 15/00; C07c 3/60, 3/04

ABSTRACT OF THE DISCLOSURE

This invention relates to a new and improved process for the manufacture of 5-alkenyl-2-norbornenes, especially 5-propenyl-2-norbornene, a particularly valuable third monomer for the manufacture of sulfur curable ethylene-α-olefin terpolymers. Highly selective condensation reactions are produced between cyclopentadiene and cis forms of 4-alkyl-1,3-butadienes, particularly those wherein the alkyl substituent contains from 1 to about 6 carbon atoms. The condensation reactions are effected at autogenous pressures at temperatures ranging from about 100° C. to about 275° C., and preferably at from about 135° C. to about 200° C. The ratio of the cis form of 4-alkyl-1,3-butadiene:cyclopentadiene should be at least about 1:1 and preferably higher, i.e., to as high as about 10:1. A ratio of about 2:1 to about 5:1 is preferred.

---

It is generally known to react or condense cyclic diolefins with acyclic diolefins. Substituted and unsubstituted cyclopentadienes, e.g., cyclopentadiene, 1-methyl-1,3-cyclopentadiene and 2-methyl-1,3-cyclopentadiene have thus been reacted with acyclic conjugated diolefins such as isoprene and trans-piperylene (U.S. 2,752,403). Unfortunately, the specificity of such reactions often leaves much to be desired.

For example, 5-propenyl-2-norbornene can be prepared by condensing piperylene with cyclopentadiene. However, a series of reactions occurs simultaneously to produce a wide variety of products. Thus, piperylene condenses with itself to produce a variety of alkenyl cyclohexenes and cyclooctadienes. Moreover, cyclopentadiene and piperylene condense to form a number of isomeric 4,7,8,9-tetrahydroindene derivatives. In addition, cyclopentadiene condenses with itself to produce dicyclopentadiene. Furthermore, the dimeric products themselves further react to produce trimers and higher condensates. Thus, selectivity is poor. But, selectivity to produce the desired 5-propenyl-2-norbornene per se is not the only adverse effect, for the 5-propenyl-2-norbornene is very difficult to separate from the reaction product mixture because the molecular weights of the various products are identical, or substantially identical.

The primary objective of the present invention is to obviate these and other process disadvantages, and particularly to provide a new and improved process for the more highly selective production of 5-alkenyl - 2 - norbornenes, particularly 5-propenyl-2-norbornene. More particularly, it is an object to provide a highly selective process for the preparation of such 5-alkenyl-2-norbornenes, at relatively low temperatures, in high yield and under conditions wherein final purification is greatly facilitated.

These and other objects are accomplished in accordance with the present invention which comprises reacting or condensing cyclopentadiene with a cis form of a 4-alkyl-1,3-butadiene. It has been found that the cis form of a 4-alkyl-1,3-butadiene, rather than the trans form or mixture containing both the cis and trans isomers, can be used in the condensation reaction to provide a marked improvement in selectivity in producing 5-alkenyl-2-norbornenes, as well as to lessen the amount of undesirable by-products.

Condensation reactions according to the present invention can be described by the following equation:

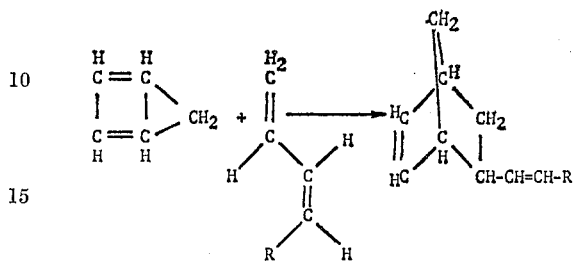

wherein R is an alkyl substitutent, preferably one containing from 1 to about 6 carbon atoms. The lower alkyls, particularly methyl, are preferred.

In the above described reaction, unsubstituted 1,3-cyclopentadiene is reacted with a cis form of a 4-alkyl-1,3-butadiene to yield a 5-alkenyl-2-norbornene. In a particularly preferred reaction, cyclopentadiene is reacted with cis-piperylene to produce high yields of 5-propenyl-2-norbornene, i.e., 5-(prop-1-en-1-yl)-bicyclo[2.2.1]hept-2-ene. Surprisingly, it has been found that an alkenyl or propenyl portion of the total 4-alkyl-1,3-butadiene molecule is unreactive in the condensation and hence can be considered as an alkenyl or propenyl substituent of a functional vinyl group.

While it is desirable to use a high purity reactant, nonetheless there are definite advantages associated with the use of a feed which, though not pure, contains a high concentration or major portion of the cis form of 4-alkyl-1,3-butadiene as opposed to one containing a high ratio of the trans isomer. The greater the molar ratio of the cis isomer relative to the trans isomer, the greater the advantages, and the benefits derived are far more than a linear relationship based on the amount of the cis isomer present. To achieve the greatest benefits, the cis form of the 4-alkyl-1,3-butadiene should be present in at least about 90 mole percent concentration, based on the total active isomer present in the mixture.

The reaction time can be varied widely, i.e. from about 1 to about 24 hours. Good results are obtained by providing reaction periods ranging from about 4 to about 12 hours.

The following examples and demonstrations present selected comparative data which illustrate and bring out the more salient features of the invention.

EXAMPLES

In the examples, two different piperylene compositions were employed, viz., 10 percent cis-piperylene and 85 percent trans-piperylene. Both piperylene compositions were at least 99.9 percent pure. Each of these portions was used to prepare separate master batch solutions consisting essentially of 1.26 moles of the respective piperylene admixed with 1.20 moles of dicyclopentadiene and 0.2 percent by weight of 2,6-di-t-butyl-p-cresol. The two master portions were each divided into three separate smaller portions.

Each of the three cis-piperylene portions, hereinafter designated as "cis," and each of the three trans-piperylene portions, hereinafter designated as "85% trans," were separately charged to glass lined reaction vessels, sealed within the vessel, and heated under autogenous pressure to 140° C., 185° C., and 230° C., respectively, for a period of two and one-half hours. At the end of this period, each of the reaction products were cooled, transferred to other vessels, and then distilled under reduced pressure (10 mm. Hg) to a final pot temperature of 120° C. The results of the runs, and the composition of the distillations, analyzed by gas chromatography, were as given in the following Table I.

The advantages of using cis-piperylene are obtained by effecting the condensation continuously, with or without a solvent. This is accomplished, e.g., by passing the reactants though a tube packed with an inert material at temperatures of from about 100° C. to about 275° C. In this

TABLE I

| Piperylene Type | Example | | | | | |
|---|---|---|---|---|---|---|
| | 1 | | 2 | | 3 | |
| | Temperature,° C. | | | | | |
| | 140 | | 185 | | 230 | |
| | 85% | | 85% | | 85% | |
| | Cis | Trans | Cis | Trans | Cis | Trans |
| Transfer Losses | 7.9 | 18.1 | 5.5 | 5.8 | 11.6 | 4.9 |
| Polymer | 4.0 | 5.9 | 23.1 | 33.4 | 65.7 | 68.3 |
| Recovered Overhead: | 88.0 | 77.9 | 71.4 | 20.8 | 22.6 | 26.6 |
| Piperylene | 41.2 | 31.4 | 16.1 | 9.8 | 8.0 | 1.3 |
| 5-propenyl-2-norbornene | 1.3 | 1.4 | 38.5 | 13.2 | 9.5 | 1.2 |
| Dicyclopentadiene | 44.7 | 42.2 | 9.6 | 12.3 | 0.3 | 0.04 |
| Methyl Tetrahydroindenes | 0 | 0.1 | 0.06 | 7.8 | 0.2 | 12.0 |
| Other | 0.86 | 2.6 | 7.2 | 17.7 | 4.7 | 12.0 |
| Conversion of Starting Materials | 14.1 | 26.4 | 74.3 | 77.9 | 91.7 | 98.7 |
| Selectivity to 5-propenyl-2-norbornene | 9.2 | 5.3 | 52 | 17 | 10.3 | 1.2 |

These results show that cis-piperylene gives far higher yields of the desired 5-propenyl-2-norbornene than trans-piperylene, and less by-products. Thus, at 185° C. selectively is 52 percent for cis and only 17 percent for trans-piperylene. Excluding polymer and unreacted monomers (piperylene and dicyclopentadiene), the dimer product from cis-piperylene at 185° C. is 84 percent 5-propenyl-2-norbornene and contains practically no methyltetrahydroindenes. On the other hand, the product from trans-piperylene at 185° C. (excluding unreacted monomers) is only 34 percent 5-propenyl-2-norbornene. Thus, it is clear that final product purity was much higher when employing cis-piperylene as contrasted with trans-piperylene.

These data also show that relatively high temperatures are less desirable because of the large amount of polymeric condensate obtained. Conversely, relatively low temperatures decrease polymer formation, but also, unfortunately, lowers conversion.

The cyclopentadiene can be charged as its dimer, i.e., dicyclopentadiene, which at process temperatures readily dissociates into mono-cyclopentadiene. Alternatively, the dicyclopentadiene can be first cracked to monocyclopentadiene and then charged.

The co-dimerization of cyclopentadiene and a 4-alkyl-1,3-butadiene can also be effected in the presence of a solvent. The use of a solvent reduces polymer formation and, therefore, increases the yield of the desired 5-alkenyl-2-norbornene. Aromatic, aliphatic, and cyclic aliphatic solvents can be used, e.g., pentane, heptane, benzene, toluene, and cyclohexane. The use of a solvent is of practical value in reducing polymer formation.

instance, it is preferred to use mono-cyclopentadiene and a substantial excess of cis-piperylene, e.g., cis-piperylene:cyclopentadiene molar ratios of from about 2:1 to about 10:1, and perferably from about 2:1 to about 5:1. The volatile starting materials, viz., piperylene and cyclopentadiene, are readily continuously separated from effluent and recycled. The residue is subjected to final fractionation to obtain a dimer product which is substantially 5-propenyl-2-norbornene.

An additional series of runs was made utilizing cis-piperylene at a reaction temperature of 185° C. The molar ratios of piperylene:cyclopentadiene and the reaction times were varied. Referring to Table II below, data are thus shown for three sets of runs (at 2, 4 and 6 hours' reaction time) for cis-piperylene:cyclopentadiene ratios of 1:1, 2:1 and 3:1, respectively. All of these runs demonstrate that 5-propenyl-2-norbornene can be made under a wide range of conditions but that a 2:1 cis-piperylene:cyclopentadiene ratio is not only very practical, but optimum, and that reaction times of 4 to 6 hours are sufficient. In fact, four hours' reaction time is near optimum when polymer formation is considered, on the one hand, and dicyclopentadiene conversion on the other. Optimum conditions thus approximate temperature condtions ranging from about 175° C. to about 195° C., molar ratios cis-piperylene:cyclopentadiene ranging from about 1.5:1 to about 2.5:1 and reaction times ranging from about 3 to about 5 hours. These conditions achieve a balance of low polymer formation, high conversion of dicyclopentadiene, and a high yield of the desired product.

TABLE II

| | Example | | | | | | | | |
|---|---|---|---|---|---|---|---|---|---|
| | 4 | 5 | 6 | 7 | 8 | 9 | 10 | 11 | 12 |
| Cis-Piperylene: Cyclopentadiene Ratio | 1.0 | 1.0 | 1.0 | 2.0 | 2.0 | 2.0 | 3.0 | 3.0 | 3.0 |
| Reaction Time, hours | 2 | 4 | 6 | 2 | 4 | 6 | 2 | 4 | 6 |
| Product Distribution: | | | | | | | | | |
| Losses, percent | 6.9 | 3.1 | 3.5 | 3.0 | 5.6 | 6.1 | 6.2 | 11.0 | 7.2 |
| Polymer, percent | 19.9 | 30.0 | 29.6 | 13.2 | 21.3 | 26.5 | 22.0 | 14.9 | 20.0 |
| Recovered Overhead, percent | 73.2 | 65.7 | 66.9 | 80.1 | 71.7 | 67.3 | 71.8 | 74.1 | 72.7 |
| Monomer (Piperylene), percent | 18.2 | 14.5 | 12.5 | 35.9 | 26.0 | 37.0 | 37.0 | 32.4 | 33.3 |
| Propenyl Norbornene, percent | 30.2 | 36.2 | 36.7 | 27.5 | 36.2 | 36.5 | 23.3 | 32.4 | 29.1 |
| Dicyclopentadiene, percent | 19.1 | 8.6 | 11.0 | 11.1 | 2.2 | 0.6 | 5.1 | 0.4 | 1.9 |
| Methyl Tetrahydroindene, percent | | 0.19 | | 0.08 | 0.09 | | | | |
| Other, percent | 5.9 | 6.3 | 6.8 | 5.4 | 7.2 | 8.5 | 6.5 | 8.9 | 8.4 |
| Yield of Propenyl Norbornene Based on Starting Dicyclopentadiene, percent | 30.2 | 36.2 | 36.7 | 41.4 | 54.7 | 55.1 | 46.9 | 65.4 | 58.8 |
| Conversion of Dicyclopentadiene, percent | 61.2 | 82.5 | 77.7 | 66.3 | 93.3 | 98.1 | 79.1 | 98.5 | 92.2 |
| Yield of Propenyl Norbornene Based on Converted Dicyclopentadiene, Percent | 49.3 | 43.8 | 47.2 | 62.4 | 58.6 | 56.2 | 59.3 | 66.4 | 63.8 |
| Theor. Conversion of Piperylene, percent | 100 | 100 | 100 | 50 | 50 | 50 | 33.3 | 33.3 | 33.3 |
| Actual Conversion of Piperylene, percent | 64.2 | 71.3 | 75.4 | 46.6 | 61.2 | 67.9 | 51.0 | 57.0 | 55.9 |
| Overhead Composition, Excluding Piperylene: | | | | | | | | | |
| Propenyl Norbornene, percent | 54.7 | 70.6 | 67.4 | 62.4 | 79.2 | 80.0 | 67.0 | 77.7 | 73.8 |
| Dicyclopentadiene, percent | 34.5 | 16.8 | 20.2 | 25.2 | 4.8 | 1.3 | 14.5 | 1.0 | 4.9 |
| Methyl Tetrahydroindene, percent | | 0.37 | | 0.18 | 0.2 | | | | |
| Other, percent | 10.7 | 12.3 | 12.5 | 12.2 | 15.8 | 18.7 | 18.5 | 21.3 | 21.3 |
| Wt. Polymer/Wt. Converted Dicyclopentadiene | 0.660 | 0.738 | 0.772 | 0.611 | 0.699 | 0.828 | 1.13 | 0.620 | 0.891 |

The results thus show that propenyl norbornene can be prepared with high selectivity under a variety of conditions, i.e., piperylene:cyclopentadiene ratios of from about 1.0 to about 3.0:1, and reaction times of from about 2 to about 6 hours.

The dicyclopentadiene can be reacted to virtual extinction and a dimer fraction containing only small amounts of dicylopentadiene readily obtained (Examples 8–10). However, with trans-piperylene, although the dicyclopentadiene is removed, more polymeric product is obtained. With cis-piperylene and dicyclopentadiene, the latter can be reacted away at no increase, and even a decrease, in polymeric product.

It is apparent that the present invention is susceptible to various changes and modifications without departing from the spirit and scope thereof.

Having described the invention, what is claimed is:

1. A process for the preparation of 5-alkenyl-2-norbornenes comprising condensing a first reactant, cyclopentadiene, with a second reactant consisting essentially of a cis form of the isomer of a 4-alkyl-1,3-butadiene, contained in major proportions within a feed, in reaction ratios of 4 - alkyl - 1,3-butadiene:cyclopentadiene ranging from about 1:1 and higher, and at temperatures ranging from about 100° C. to about 275° C.

2. The process of claim 1 wherein the feed containing the second reactant includes at least about 90 percent of the cis form of the 4-alkyl-1,3-butadiene, based on the total concentration of the active isomer.

3. The process of claim 1 wherein the 4-alkyl-1,3-butadiene is cis-piperylene.

4. The process of claim 1 wherein unsubstituted 1,3-cyclopentadiene is reacted with cis-piperylene to produce 5-propenyl-2-norbornene.

5. The process of claim 1 wherein the reaction is conducted at temperatures ranging from about 135° C. to about 200° C.

6. The process of claim 1 wherein the ratio of the 4-alkyl - 1,3-butadiene:cyclopentadiene ranges from about 2:1 to about 5:1.

7. In a process for the production of 5-propenyl-2-norbornene by condensation of unsubstituted cyclopentadiene with piperylene, the improvement comprising introducing the piperylene reactant as a feed which contains major quantities of cis-piperylene.

8. The process of claim 7 wherein cis-piperylene is contained in the feed in concentration at least as high as about 90 percent, based on the total active isomer present.

9. The process of claim 7 wherein the reaction is conducted at temperatures ranging from about 100° C. to about 275° C.

10. The process of claim 7 wherein the ratio of cis-piperylene:cyclopentadiene ranges at least about 1:1, and higher, and the temperature ranges from about 135° C. to about 200° C.

References Cited

UNITED STATES PATENTS 2,752,403    6/1968    Schutze et al. _____ 260—666

DELBERT E. GANTZ, *Primary Examiner.*

V. O'KEEFE, *Assistant Examiner.*

UNITED STATES PATENT OFFICE
CERTIFICATE OF CORRECTION

Patent No. 3,427,360            February 11, 1969

Henry S. Makowski

It is certified that error appears in the above identified patent and that said Letters Patent are hereby corrected as shown below:

Column 2, lines 9 to 14, the formula should appear as shown below:

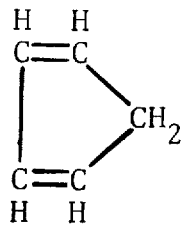

same column 2, line 56, "10%" should read -- 100% --.

Signed and sealed this 21st day of April 1970.

(SEAL)
Attest:

Edward M. Fletcher, Jr.            WILLIAM E. SCHUYLER, JR.

Attesting Officer                   Commissioner of Patents